May 25, 1965  F. WAHL  3,184,837
APPARATUS FOR MOUNTING ARTICLES
Filed April 8, 1963  4 Sheets-Sheet 3
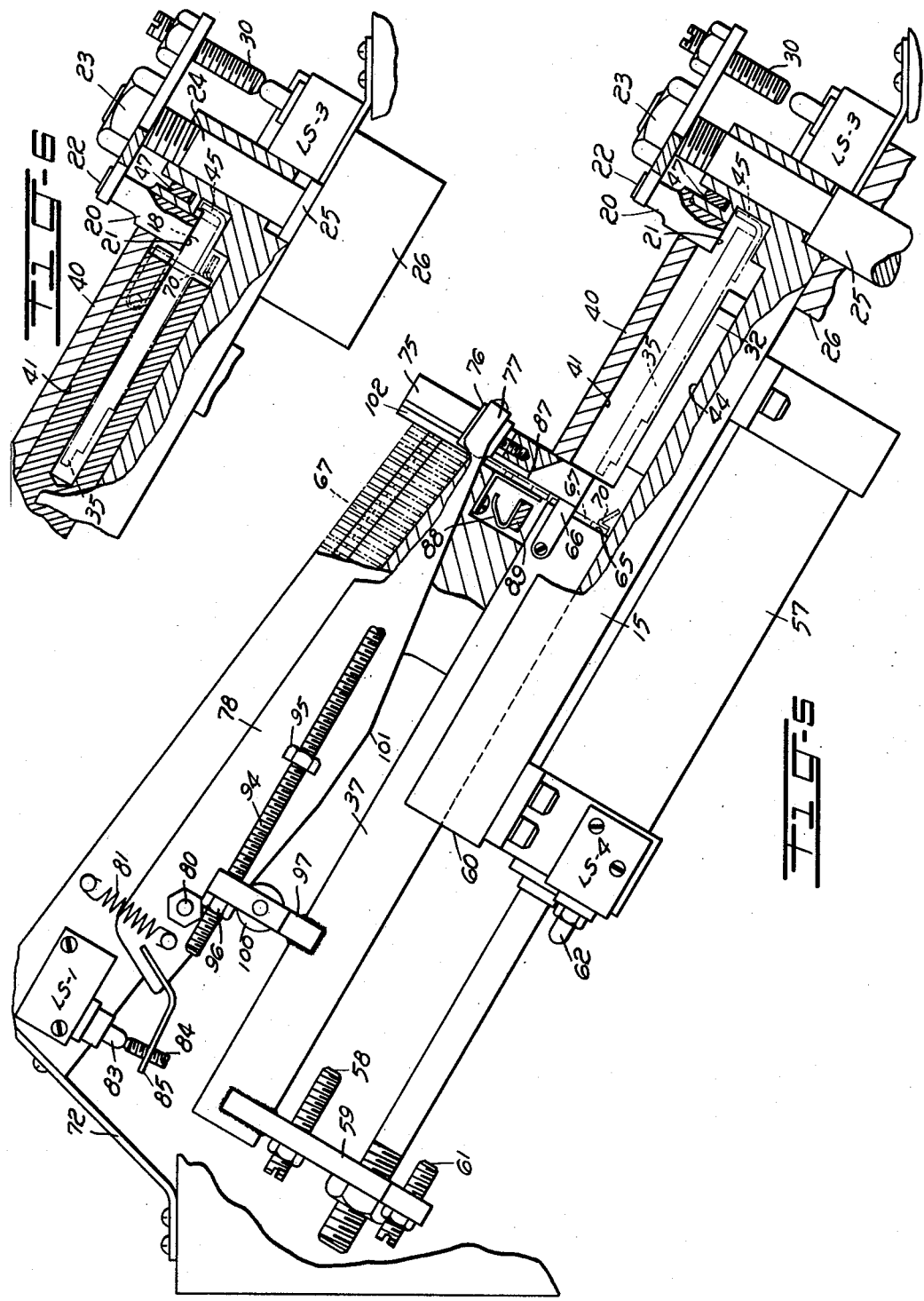

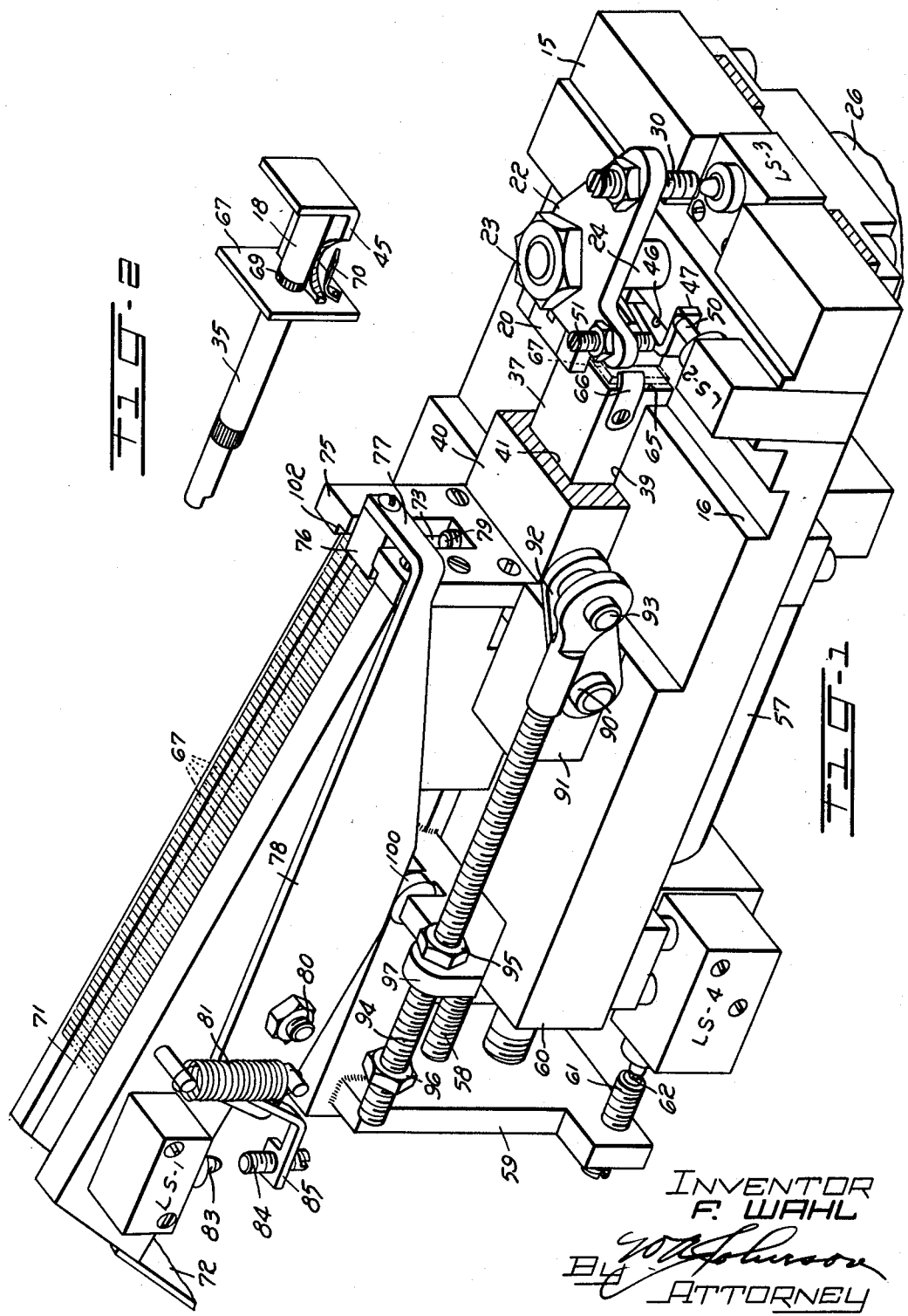

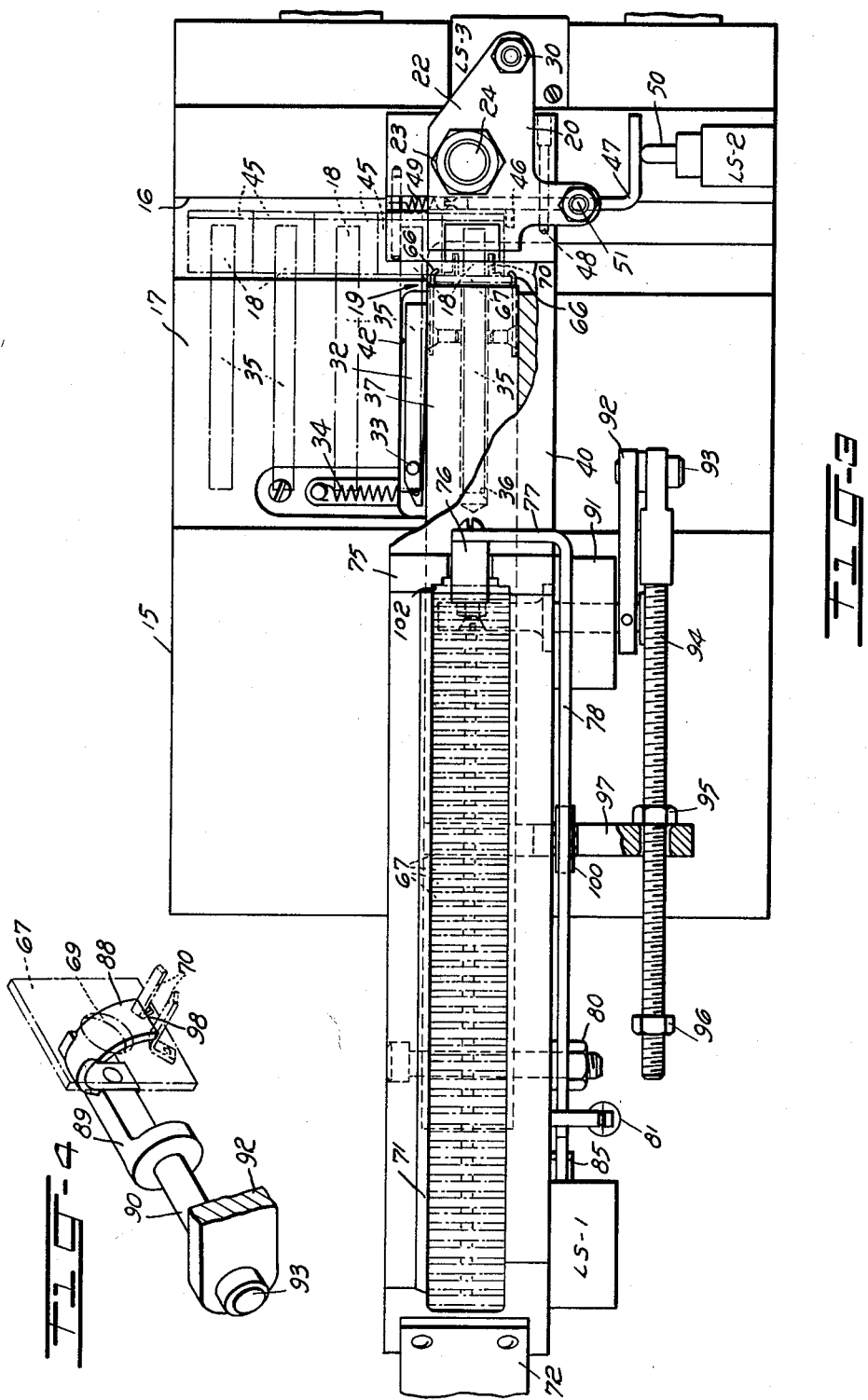

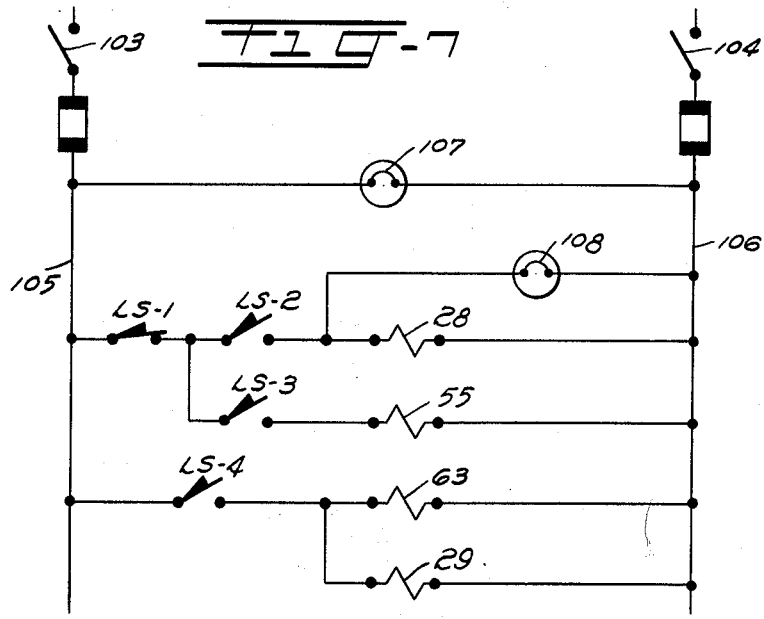
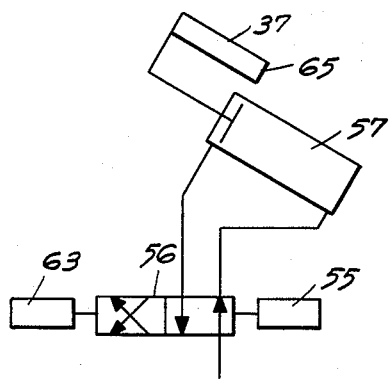
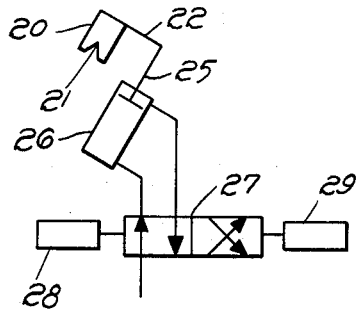
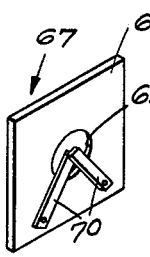

3,184,837
APPARATUS FOR MOUNTING ARTICLES
Frank Wahl, North Bergen, N.J., assignor to Western Electric Company, Incorporated, New York, N.Y., a corporation of New York
Filed Apr. 8, 1963, Ser. No. 271,315
12 Claims. (Cl. 29—203)

This invention relates to apparatus for mounting articles, particularly apertured spool heads on shanks of cores.

In the manufacture of certain types of relays, the cores are pre-formed together with spool heads, which are to be mounted thereon prior to the mounting of the coils on the cores.

In the present instance, the spool heads are blanked squares of dielectric material centrally apertured and having pairs of flat type terminals initially fixed thereto and extending over the apertures so that the spool heads may be stacked for handling. However, before the spool heads can be mounted on their cores, the terminals must be bent at angles preferably right angles with respect to the spool head.

An object of the present invention is an apparatus which is automatic in operation and highly efficient in mounting apertured spool heads on shanks of cores.

According to the object, the invention includes a ram having a working end apertured to receive the shanks of successive cores while means is provided to support the cores successively with the shanks thereof aligned with the aperture of the ram, a chute having an exit end adapted to support the spool heads in stacked formation and feed them successively to the exit end thereof while a feeder is operated to feed the spool heads to the working end of the ram for mounting thereby on the shanks of the core during reciprocation of the ram.

An additional feature includes a conditioning unit interposed between the exit end of the chute and the receiving position of the working end of the ram to bend the terminals of the spool heads at angles and away from the apertures of the spool heads.

Other objects and advantages will be apparent from the following detailed description when taken in conjunction with the accompanying drawings wherein:

FIG. 1 is an isometric view of the apparatus in operated position;

FIG. 2 is an isometric view of a spool head mounted on a core;

FIG. 3 is a top plan view of the apparatus;

FIG. 4 is a fragmentary isometric view of the conditioning unit;

FIG. 5 is a side elevational view of the apparatus shown in open position, portions thereof being shown in section;

FIG. 6 is a fragmentary vertical sectional view of a portion of the apparatus shown in operated position;

FIG. 7 is a schematic illustration of the electrical controls for the apparatus;

FIG. 8 is a schematic illustration of the operating means for the core clamp;

FIG. 9 is a schematic illustration of the operating means for the ram; and

FIG. 10 is an isometric view of one of the spool heads prior to reaching the conditioning unit.

The apparatus includes a table 15 supported in any suitable manner not shown, such as on a bench, and is provided with a lateral groove 16 and an associated surface 17 on which cores 18 may be moved successively into mounting position. The mounting position is indicated generally at 19 where a clamp 20, for the core is provided with a V-shaped groove 21 in its under surface to engage and center the core in its mounting position. The clamp 20 is fixed at its upper end to a member 22 adjustably mounted through the aid of a nut 23 on a threaded end 24 of a piston rod 25. An air cylinder 26 for the piston rod 25 is shown schematically in FIG. 8 where a valve 27 is under the control of solenoids 28 and 29, the solenoids being represented in the electrical control circuit in FIG. 7 by the same reference numerals. An adjustable screw 30, carried by the member 22, FIG. 6 is positioned to operate switch LS–3 closed when the clamp 20 is closed on a core at the mounting position. A member 32, pivotally supported at 33, and actuated by a spring 34, serves to hold the cores 18 against tilting and to align their shanks 35 with an aperture 36 of a ram 37.

The ram 37 is substantially square in cross-section and is positioned to be reciprocated in a groove 39 of the table 15. A guide 40, mounted on the table 15, has a hollow portion 41 for the upper part of the ram 37. The groove 39 is widened at 42, FIG. 3, to receive the member 32 so that this member may rest upon the bottom surface 44 of the groove and be moved by the spring 34 into a diagonal position across the groove when the ram 37 is at its receiving position to support the shank 35 of the next core in alignment with the aperture 36 of the ram. The ram 37 moves the member 32 into the position shown in FIG. 3 when moved to the operating position.

The cores 18 are moved manually across the table 15 with portions 45 thereof disposed in the groove 16 so that in each instance the leading core will move the core with the spool head mounted thereon from the operating position while it is moved into the operating position. During this interval, the portion 45 of the incoming core will engage a projection 46 of a switch lever 47, which is pivoted at 48 and move it in a direction against the force of a spring 49. The switch lever 47, at this time is located to engage a plunger 50 of switch LS–2 and actuate it closed. The function of the switch LS–2, as shown in FIG. 7, is to close a circuit through solenoid 28 to operate valve 27 FIG. 8 to operate air cylinder 26 FIG. 6 to operate the holder 20 closed to clamp the core in place. During operation of the air cylinder 26, an adjustable screw 51, mounted on the member 22, engages the lever 47 and moves it about its pivot 48 free of the plunger 50 to free switch LS–2 to open. The other adjustable screw 30, mounted on the member 22, actuates switch LS–3 closed to energize solenoid 55, to operate valve 56, to operate air cylinder 57, to move the ram 37 from the receiving position shown in FIG. 5 to the operating position shown in FIGS. 1, 3 and 6. The operating position or end of the operating stroke of the ram 37 is controlled by an adjustable screw 58 supported by a member 59 fixed to the ram 37 and positioned to engage a surface 60 of the table 15. Another adjustable screw 61, carried by the member 59, will engage a plunger 62 of switch LS–4 and move the switch closed. Closing of switch LS–4, as shown in FIG. 7, will complete circuits through solenoid 29 and also solenoid 63 operating their respective valves 27 and 56 to open the clamp 20 and return the ram 37 to its starting or receiving position.

The working end 65 of the ram 37 is provided with resilient members 66 upon each side thereof to removably receive the successive spool heads 67. The spool heads are like to that shown in FIG. 10 where a substantially square dielectric member 68 has a central opening 69 therein and flat terminals 70 fixed at their lower ends to the member 68 and extending partially across the aperture 69. The spool heads are made in this manner so that they may be disposed in stacked formation as shown in FIGS. 1, 3 and 5 where they are disposed in a chute 71 with one end mounted at 72 and the other end which may be defined as an exit end 73 disposed in alignment with the working end 65 of the ram when at its receiving position shown in FIG. 5. Actually, the chute 71 has its exit end secured to a U-shaped bracket 75, mounted on the guide 40, and adapted to receive a feeder 76. The feeder 76 is fixed to one end 77 of a lever 78, its downward movement being controlled by an adjustable screw 79. The lever 78 is pivotally mounted at 80 at one side of the chute 71 and is normally urged clockwise by a spring 81. A switch LS-1 is mounted on the adjacent side of the chute 71 and has a plunger 83 positioned to be actuated into closed position by an adjustable screw 84, mounted on a projection 85 of the lever 78. When the lever has been actuated to move the feeder 76 downwardly a full stroke against the stop 79 to move the leading spool head from the exit end of the chute into a conditioning unit 87 as shown in FIG. 3 the switch LS-1 will be operated closed.

The conditioning unit 87 includes a terminal bending element 88 FIGS. 4 and 5 supported by a rocker arm 89, mounted on a spindle 90, which is journalled in a bearing block 91 FIG. 1 and has one end of a lever 92 mounted thereon. The other end of the lever 92 carries a spindle 93 for connection with one end of an actuator 94, which is threaded to receive nuts 95 and 96. The actuator 94 extends through an aperture in a member 97, which is fixed to the ram 37 as shown in FIG. 5 to engage the nuts 95 and 96 alternately at predetermined intervals to cause rocking of the arm 89 into and out of operating position to cause the element 88 to move through the aperture of the spool head 67 in the conditioning unit so that its leading edge 98 will engage the terminals 70 and bend them away from the aperture 69 into the position shown in FIG. 4 substantially at right angles to the spool head. This action takes place during the forward movement of the ram to move a previously conditioned spool head onto the core, the element 88 being returned to its starting position during the return movement of the ram. A roller 100, supported by the member 97, is positioned to ride on a cam surface 101 of the lever 78 to bring about the desired actions of the feeder 76. The U-shaped bracket 75 has a recess 102 in its inner face for the leading spool head. The feeder 76 is capable of holding the spool heads against advancing in the chute 71 while the leading spool head is moved to the conditioning unit and the feeder is returned. The contour of the cam surface 101 and its relationship with the roller 100 is such that as the ram 37 reaches its receiving position the feeder 76 will move a spool head from the exit end of the chute 71 into the conditioning unit 87 and move the conditioned spool head from the conditioning unit onto the working end of the ram where it will be held in place by the resilient members 66.

*Operation*

To condition the apparatus for operation, switches 103 and 104 in lines 105 and 106 of FIG. 7 are closed. At this time, a circuit is completed through an indicating lamp 107 to show that the apparatus is ready for operation. During each operation of the clamp 20 another lamp 108 is energized. The apparatus is almost fully automatic in its operation. In the present illustration, it is suggested that the cores 18 are moved manually into and out of the operating position but it should be understood that if the cores are fed automatically, the apparatus would be completely automatic in its operation.

FIG. 5 illustrates what may be termed the starting position for the apparatus where at the end of a previous cycle, that is, at the return of the ram 37 a spool head has been moved from the exit end of the chute into the conditioning unit 87 and the conditioned spool head from the conditioning unit has been placed on the working end of the ram. Also, as illustrated in FIG. 5, switch LS-1 has been closed. Therefore, when the next core 18 is moved into position it will operate switch LS-2 closed through the actuator 47, energizing solenoid 28 to operate the air cylinder 26 through the valve 27 to move the clamp 20 into position to hold the core against displacement. The shank 35 of the core when being moved into position will be supported by the member 32 FIGS. 3 and 5. When the clamp 20 is operated into closed position the actuator 47 for switch LS-2 will be moved out of registration with the plunger 50 for the switch and at the same time switch LS-3 will be closed. This completes a circuit through the solenoid 55 operating valve 56 to operate the air cylinder 57 to move the ram from its receiving position to its operated position where it will move the conditioned spool head onto the core. As illustrated in FIG. 2, the spool head will be forced onto a serrated portion of the shank 35 to hold the spool head in place so that when the ram is returned the resilient members 66 may be moved free of the spool head without disturbing its position. At the end of the forward stroke of the ram, switch LS-4 is operated closed energizing both solenoids 24 and 63 to cause operation of their valves 27 and 56 to cause opening the clamp 20 and returning the ram to its starting position. During forward motion of the ram, the conditioning unit 87 is operated causing the element 88 to condition the terminals 70 of the spool head in the unit by bending them as illustrated in FIG. 4. During the return movement of the ram, the conditioning unit 87 is returned to its normal position as illustrated in FIG. 5 and the feeder 76 has been made ready to bring about the next feeding operation feeding the next spool head from the exit end of the chute into the conditioning unit 87 and moving the conditioned spool head from the unit 87 onto the working end 65 of the ram.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for mounting apertured spool heads, having terminals initially lying adjacent like surfaces thereof in the areas of the apertures, singly on shanks of cores comprising:

a ram having a working end apertured to receive the shanks of successive cores, a table to support the ram for reciprocable movement and adapted to support the cores successively in an operating position with the shanks thereof aligned with the aperture of the ram, a chute mounted above the table to support the spool heads in stacked formation therein and having an exit end adapted to locate the spool heads successively above said operating position, means supported by the table to reciprocate the ram to move the working end thereof between a receiving position, in general alignment with the exit end of the chute, and a mounting position relative to each shank, a spool head conditiong unit disposed adjacent the exit end of the chute, and a feeder supported by the table operable to feed the spool heads successively from the exit end of the chute into a first position adjacent the spool head conditioning unit and then into a second position adjacent the working end of the ram while the ram is in the receiving poistion for mounting thereby on the shanks of the cores singly.

2. An apparatus for mounting apertured spool heads according to claim 1 in which:
a conditioning unit supported by the table is interposed between the exit end of the chute and the receiving position of the working end of the ram to bend the terminals of the spool heads at angles relative to said surfaces of the spool heads and away from the apertures thereof.

3. An apparatus for mounting apertured spool heads according to claim 1 in which:
a conditioning unit is supported by the table and interposed between the exit end of the chute and the receiving position of the working end of the ram to bend the terminals of the spool heads at angles relative to said surfaces of the spool heads and away from the apertures thereof,
the conditioning unit including a bending element, and
means supporting the bending element and operable to move the element through the aperture of each spool head at the conditioning unit to bend terminals thereof away from the aperture of the spool head.

4. An apparatus for mounting apertured spool heads according to claim 1 in which:
a conditioning unit is supported by the table and interposed between the exit end of the chute and the receiving position of the working end of the ram to bend the terminals of the spool heads at angles relative to said surfaces of the spool heads and away from the apertures thereof,
the conditioning unit including a bending element,
means supporting the bending element and operable to move the element through the aperture of each spool head at the conditioning unit to bend terminals thereof away from the aperture of the spool head,
the feeder being adapted to move a spool head from the exit end of the chute to the conditioning unit and simultaneously move a spool head from the conditioning unit to the working end of the ram.

5. An apparatus for mounting apertured spool heads according to claim 1 in which:
a clamp is supported by the table and movable into closed and open positions, and
means supported by the table and operable by movement of each core into the operating position to move the clamp into closed position on the core.

6. An apparatus for mounting apertured spool heads according to claim 1 in which:
a clamp is supported by the table and movable into closed and open positions,
means supported by the table and operable by movement of each core into the operating position to move the clamp into closed position on the core, and
means supported by the table and responsive to the movement of the clamp into closed position to move the ram into its mounting position.

7. An apparatus for mounting apertured spool heads according to claim 1 in which:
a clamp is supported by the table and movable into closed and open positions,
means supported by the table and operable by movement of each core into the operating position to move the clamp into closed position on the core,
means supported by the table and responsive to the movement of the clamp into closed position to move the ram into its mounting position,
a conditioning unit, supported by the table interposed between the exit end of the chute and the receiving position of the working end of the ram, and operable to bend the terminals of the spool heads at angles relative to said surfaces of the spool heads and away from the apertures thereof, and
means supported by the table and responsive to the movement of the ram to operate the conditioning unit.

8. An apparatus for mounting apertured spool heads according to claim 1 in which:
a clamp is supported by the table and movable into closed and open positions,
means supported by the table and operable by movement of each core into the operating position to move the clamp into closed position on the core,
means supported by the table and responsive to the movement of the clamp into closed position to move the ram into its mounting position,
a conditioning unit supported by the table, interposed between the exit end of the chute and the receiving position of the working end of the ram, operable to bend the terminals of the spool heads at angles relative to said surfaces of the spool heads and away from the apertures thereof,
means supported by the table and responsive to the movement of the ram to operate the conditioning unit, and
means supported by the table actuated by the ram to operate the feeder.

9. An apparatus for mounting apertured spool heads according to claim 1 in which:
a conditioning unit is supported by the table and interposed between the exit end of the chute and the receiving position of the working end of the ram to bend the terminals of the spool heads at angles relative to said surfaces of the spool heads and away from the apertures thereof, and
means supported by the table and responsive to the movement of the ram to operate the feeder.

10. An apparatus for mounting apertured spool heads according to claim 1 in which:
a conditioning unit is supported by the table and interposed between the exit end of the chute and the receiving position of the working end of the ram to bend the terminals of the spool heads at angles relative to said surfaces of the spool heads and away from the apertures thereof, and
means supported by the table and responsive to the movement of the ram to operate the conditioning unit.

11. An apparatus for mounting apertured spool heads according to claim 1 in which:
a clamp is supported by the table and movable into closed and open positions,
means operable by movement of each core into the operating position to move the clamp into closed position on the core,
means supported by the table and responsive to the movement of the clamp into closed position to move the ram into its mounting position, and
separate means supported by the table and responsive to the movement of the ram into its mounting position to return the ram to its receiving position and to move the clamp to its open position.

12. An apparatus for mounting apertured spool heads according to claim 1 in which:
a clamp is supported by the table and movable into closed and open positions,
means supported by the table and operable by movement of each core into the operating position to move the clamp into closed position on the core,
means supported by the table and responsive to the movement of the clamp into closed position to move the ram into its mounting position,
a conditioning unit supported by the table, interposed between the exit end of the chute and the receiving position of the working end of the ram, operable to bend the terminals of the spool heads at angles relative to said surfaces of the spool heads and away from the apertures thereof, means supported by the table and responsive to the movement of the ram to operate the conditioning unit, separate means supported by the table and responsive to the movement of the ram into its mounting position to return the ram to its receiving position and to move the clamp to its open position, and means supported by the table and responsive to the movement of the ram into its receiving position to operate the feeder to move a spool head from the exit end of the chute to the conditioning unit and move a conditioned spool head from the conditioning unit to the working end of the ram.

References Cited by the Examiner
UNITED STATES PATENTS
2,995,810  8/61  Wilson et al. _____ 29—208
3,067,496  12/62  Rayburn _____ 29—203

WHITMORE A. WILTZ, *Primary Examiner.*
THOMAS H. EAGER, *Examiner.*